Jan. 7, 1969    C. W. VAN MARTER    3,421,068
TRICKLE CHARGE VOLTAGE STABILIZATION NICKEL-CADMIUM BATTERY
Filed May 27, 1966                                      Sheet 1 of 2

Charles W. Van Marter
    INVENTOR.

BY
    *Harold A. Levey Jr.*
    ATTORNEY

Charles W. Van Marter
INVENTOR.

United States Patent Office 3,421,068
Patented Jan. 7, 1969

3,421,068
TRICKLE CHARGE VOLTAGE STABILIZATION NICKEL-CADMIUM BATTERY
Charles W. Van Marter, Syracuse, N.Y., assignor to General Electric Company, a corporation of New York
Filed May 27, 1966, Ser. No. 553,429
U.S. Cl. 320—31  10 Claims
Int. Cl. H02j 7/04; H02j 7/10

ABSTRACT OF THE DISCLOSURE

To prevent overcharge of a nickel-cadmium battery the terminals are shunted with silicon diodes connected in series to provide a cumulative forward breakdown potential level slightly below the cumulative overcharge potential of the cells within the battery that are shunted by the diodes. The forward breakdown potential of the silicon diodes and the overcharge potential of nickel-cadmium cells vary similarly as a function of temperature. The diodes may be mounted in a terminal recess for thermal equilibration with the battery.

---

This invention relates to a novel trickle charge system for nickel-cadmium storage batteries and to a novel battery unit incorporated in the system. More particularly, it relates to a trickle charging system employing silicon diodes electrically connected across each cell of a battery to protect it from overcharging. The diodes are arranged to have the same temperature as the cell to which they are connected and thereby compensate for changes in the overcharging characteristics of the cells resulting from temperature variations.

Trickle or slow charging of batteries is used when the duty cycle is relatively short so that a comparatively long charging time is available to offset the drain on the battery during periods of discharge. In many cases batteries in the standby category are also connected to trickle chargers in order to offset the slow charge deterioration that occurs during periods of nonuse. The primary advantages of trickle charging as opposed to fast charging is the relatively low cost of the equipment, which need not provide nearly as great a current flow. On the other hand, since a trickle charger must run for a much longer period of time than a fast charger and sometimes must run indefinitely, it is highly desirable that it be capable of unattended operation. In particular, overcharging of the battery can damage it and therefore, a trickle charging system should include a provision for cutting off or materially reducing the charging current delivered to the battery when the latter is fully charged.

The fully-charged condition of a battery is ordinarily ascertainable by measuring the voltage across it and therefore a voltage-responsive cutout in the charger might appear to be an attractive solution to the problem. However, in the nickel-cadmium batteries to which the present invention is directed, this voltage undergoes a substantial change with the temperature of the battery and thus a conventional simple high-voltage cutout will not provide satisfactory operation.

Alternatively, the charging current may be continuously maintained at a level sufficiently low to prevent appreciable battery damage. However, this results in discharge of the battery if appreciable charge is drawn therefrom.

Accordingly, it is a principal object of the present invention to provide a trickle charging system for storage batteries, particularly batteries of the nickel-cadmium type. A more specific object is to provide a trickle charging system which prevents overcharging of the battery and, in particular, prevents the potential across the cell from exceeding a level at which gas is effused from the electrolyte therein.

Another object of the invention is to provide a trickle charging system of the above type which is compensated for changes in the overcharging potential due to temperature changes in the cell.

A further object is to provide a trickle charging system of the above type in which the overcharging protection is provided at little additional cost.

A still further object is to provide a system of the above type capable of a relatively high trickle charge rate.

Another object is to provide an overcharge-protected battery unit for use in a system of the above type.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

In general, the present invention makes use of the forward voltage drop of a semiconductor diode to guard against overcharging of a nickel-cadmium battery. Speaking in terms of a single-cell unit, one or more diodes in series with each other are connected between the terminals of the cell, with the forward direction of the diodes being the same as the direction of the charging current therefor, i.e., opposing current flow from the cell. When a nickel-cadmium cell is fully charged, further charging current causes an internal reaction which is different from the reaction during normal charge and discharge. Specifically, oxygen is evolved from the electrolyte and this takes place at a significantly higher potential than the normal potential across the sill.

A semiconductor diode has a junction or threshold potential which must be exceeded before appreciable forward current will flow through it. At greater potentials, substantial current may be passed through the diode and, in fact, it may be constructed with a very low dynamic resistance so that a large current will flow through it at a potential only slightly above the threshold potential. Enough diodes are connected in series across the cell to provide a total threshold voltage somewhat less than the overcharge voltage at which oxygen generation takes place. Thus, when charging is completed and the cell voltage begins to rise, it exceeds the combined threshold potential of the diodes before reaching the overcharge voltage and the diodes conduct, thereby shunting substantially all of the charger current around the cell and preventing overcharging.

As noted above, the overcharge voltage varies with temperature. However, I have found that the forward voltage drop (including the junction potential) of a semiconductor diode carrying a current corresponding to a substantial trickle charge rate varies with temperature in much the same manner as the overcharge voltage of a nickel-cadmium cell. In particular, the forward voltage drop of a silicon diode varies almost identically with the overcharge voltage. Thus, the diodes provide overcharge protection over a substantial temperature range while permitting essentially complete charging of the cell over the entire range.

Figure 1:
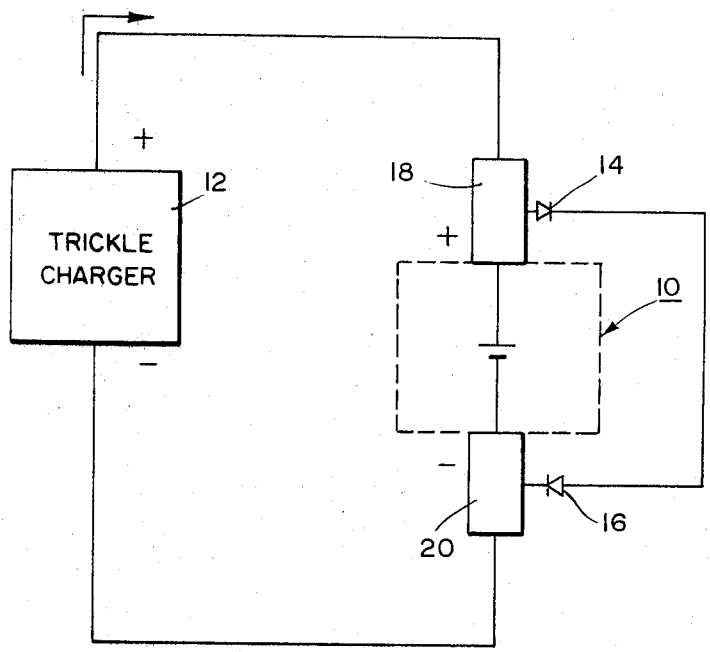
FIG. 1 is a schematic diagram of a trickle charging system embodying the invention.

In FIG. 1 I have illustrated a single-cell charging system in which a nickel-cadmium cell generally indicated at 10 is charged by a trickle charger 12. A pair of silicon diodes 14 and 16 are connected in series between the terminals 18 and 20 of the cell 10. The forward direction of the diodes 14 and 16 corresponds to the polarity of the cell 10. That is, the diodes are connected to conduct current from the charger 12 and block current from the cell 10.

Figure 2:
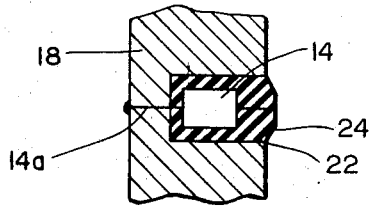
FIG. 2 is a fragmentary longitudinal section of a battery terminal showing the manner in which the semiconductor diodes of FIG. 1 are mounted.

The diodes 14 and 16 are disposed in close thermal relationship with the terminals of the cell 10 so that their temperatures essentially equal the cell temperatures and thus vary directly therewith. One arrangement for accomplishing this is illustrated in FIG. 2 where the diode 14 is seen to be disposed within a cavity 22 in the terminal 18. A lead 14A of the diode extends from the cavity 22 on through the terminal, with its end soldered or welded to the outer surface of the terminal. A thin plastic sleeve 24, surrounding the diode 14, electrically insulates it from the terminal 18 while providing for direct conduction of heat between the terminal and the diode; however this sleeve is not necessary if reverse polarity and forward polarity diodes are used.

Assuming that the charger 12 delivers a current of one ampere, I have found that a pair of type A44F and AA45F silicon diodes 14 and 16 will provide suitable overcharge protection for a nickel-cadmium cell over a temperature range of 0 to 40° C. and can be expected to operate satisfactory over a substantially greater range. This is a substantial charging rate and well above the rate at which the cell discharges under standby conditions.

Figure 3:
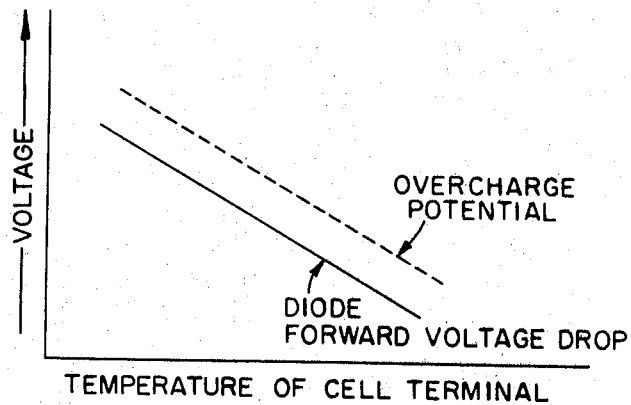
FIG. 3 is a graph showing the relationship of the temperature characteristic of the overcharge voltage of a nickel-cadmium cell and the forward drop of a silicon diode.

FIG. 3 shows the relationship between the temperature characteristics of the oxygen generation potential (overcharge voltage) of the cell 10 and the combined forward voltage drop of the diodes 14 and 16 at a relatively high trickle charge rate. The forward voltage drop of the diodes is seen to be somewhat less than the overcharge potential. Accordingly, before the overcharge potential is reached, the combined forward voltage drop across the diodes 14 and 16 (FIG. 1) is at a level corresponding to the entire current from the charger 12, which in most applications is essentially a constant-current device, i.e., has a substantially greater internal resistance than the cell 10. The voltage across the diodes cannot exceed this level for such current, and therefore, continued current from the charger will not overcharge the cell 10. Preferably, the diodes are constructed so that their threshold of conduction is at a voltage level only slightly below the forward drop corresponding to the current from the charger 12. Thus, during normal charging only negligible current from the charger is diverted through the diodes.

As shown in FIG. 3, the forward voltage drop of the diodes and the overcharge potential of the cell 10 vary essentially identically with the temperature of the cell terminals. Accordingly, the diodes can be constructed for conduction of the full charger current at a potential just slightly below the overcharge potential without the danger of overcharge. This means that a full charge of the cell 10 is permitted by the protection system over the entire temperature range. If there were not such close correspondence between the two temperature characteristics, the system would have to limit the cell 10 to less than the full charge over part of the range in order to insure protection against overcharge over the rest of the range.

Figure 4:
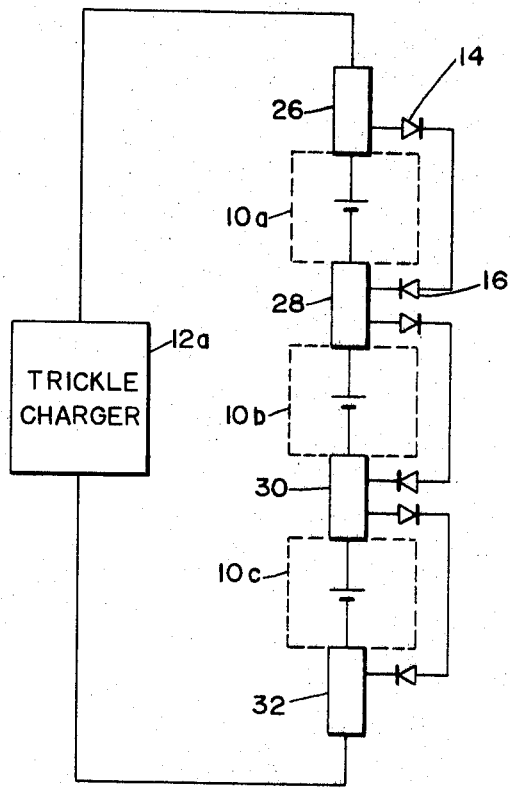
FIG. 4 is a schematic diagram of a multiple cell battery embodying the invention.

In FIG. 4 a trickle charger 12A is shown connected to a battery comprising cells 10A, 10B and 10C, each of which is similar to the cell 10 of FIG. 1. The battery has terminals 26, 28, 30 and 32, the terminals 28 and 30 being internal terminals common to the cells 10A and 10B, and 10B and 10C, respectively. Also included are the diodes 14 and 16, connected in series across each of the cells and preferably closely coupled thermally to the respective cells by way of their terminals.

In operation the diodes connected across each cell of FIG. 4 protect that cell in the manner described above with reference to the circuit of FIG. 1. Thus, as each cell comes fully charged the diodes connected to it shunt the charging current around it to prevent overcharging.

Thus I have described a trickle charge system permitting essentially full charge of the battery over a wide range of temperatures while at the same time preventing overcharge. The protection is provided by diodes connected to shunt the charge current around the battery cells when the voltage across the cells exceeds a level above the threshold voltages of the diodes and this is somewhat less than the overcharge potential of the cells. The diodes are low cost components and are readily housed within the battery terminals, where they take on the battery temperatures and thereby provide temperature compensation of the overcharge protecting function. The temperature compensation is particularly effective when silicon diodes are used to provide overcharge protection for nickel-cadmium cells.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A battery charging system comprising
   a battery including first and second terminals,
   a charger connected across said terminals to charge said battery,
   at least one of said terminals having a recess therein,
   a semiconductor diode having first and second leads received in said recess,
   said first lead being connected to said one terminal,
   electrically insulative and thermally conductive means mounting said diode within the terminal recess with said second lead insulated from said one terminal, and
   means electrically connecting said second lead to said second terminal.

2. A battery charging system according to claim 1 in which each of said terminals are recessed and each is provided with a semiconductor diode as recited, said diodes being electrically connected in series between said terminals.

3. A battery charging system according to claim 1 in which said semiconductor diode is a silicon diode.

4. A battery charging system according to claim 1 in which said battery is a nickel-cadmium battery.

5. A battery charging system according to claim 2 in which each of said semiconductor diodes is a silicon diode and said battery is a nickel-cadmium battery.

6. The combination comprising
a battery including first and second terminals,
at least one of said terminals having a recess therein,
a semiconductor diode having first and second leads received in said recess,
said first lead being connected to said one terminal,
electrically insulative and thermally conductive means mounting said diode within the terminal recess with said second lead insulated from said one terminal, and
means electrically connecting said second lead to said second terminal.

7. The combination according to claim 6 in which each of said terminals are recessed and each is provided with a semiconductor diode as recited, said diodes being electrically connected in series between said terminals.

8. The combination according to claim 6 in which said semiconductor diode is a silicon diode.

9. The combination according to claim 6 in which said battery is a nickel-cadmium battery.

10. The combination according to claim 7 in which each of said semiconductor diodes is a silicon diode and said battery is a nickel-cadmium battery.

References Cited

UNITED STATES PATENTS

| | | | |
|---|---|---|---|
| 3,102,222 | 8/1963 | Harmer | 320—15 X |
| 3,148,322 | 9/1964 | Booe et al. | 320—43 |
| 3,213,345 | 10/1965 | Loftus | 320—17 |
| 3,237,078 | 2/1966 | Mallory | 320—17 |
| 3,264,546 | 8/1966 | Foster | 320—35 |
| 3,363,163 | 1/1968 | Nord et al. | 320—35 X |

OTHER REFERENCES

Motorola, Silicon Zener Diode and Rectifier Handbook, 2nd ed., 1961, pp. 119, 126 relied on.

Vinal, Storage Batteries, 4th ed., 1951, p. 244 relied on.

JOHN F. COUCH, *Primary Examiner.*

S. WEINBERG, *Assistant Examiner.*

U.S. Cl. X.R.

320—35, 39